(No Model.)
J. B. MOSCROP.
FISHING REEL.
No. 446,102.  Patented Feb. 10, 1891.
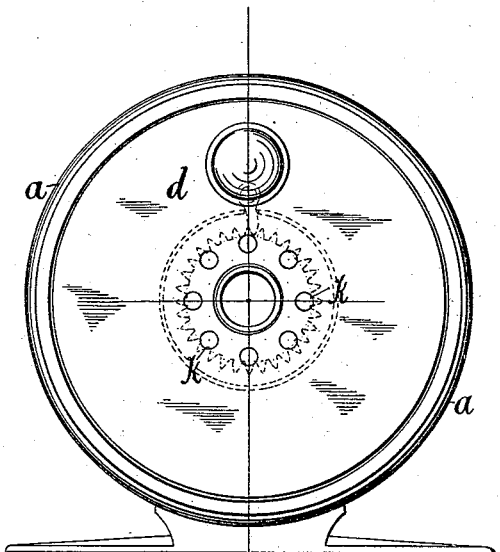
FIG. 1.
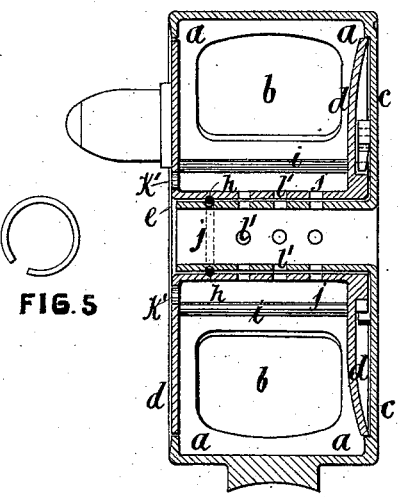
FIG. 5.
FIG. 2.
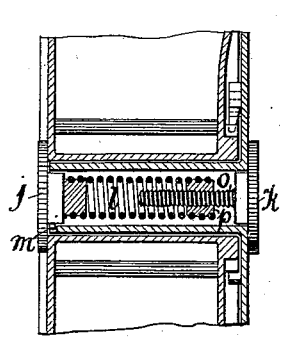
FIG. 6.
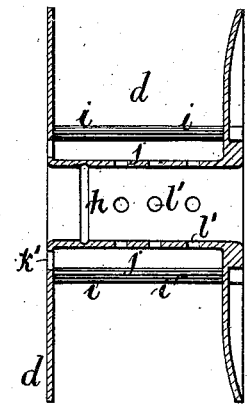
FIG. 4.
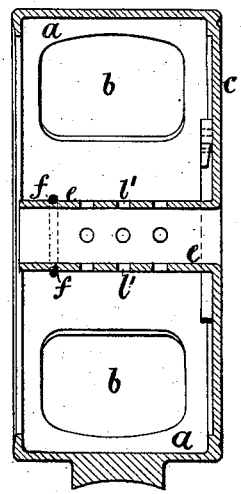
FIG. 3.
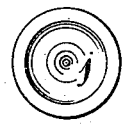
FIG. 8.
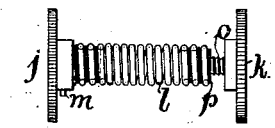
FIG. 7.
Witnesses:
C. J. Bell
D. McMaster
Inventor.
J. B. Moscrop.
by Herbert W. Jenner
Attorney.

UNITED STATES PATENT OFFICE.

JOHN BROWN MOSCROP, OF URMSTON, ENGLAND.

FISHING-REEL.

SPECIFICATION forming part of Letters Patent No. 446,102, dated February 10, 1891.

Application filed October 29, 1889. Serial No. 328,553. (No model.) Patented in England February 29, 1888, No. 2,900, and June 4, 1888, No. 8,122.

*To all whom it may concern:*

Be it known that I, JOHN BROWN MOSCROP, a subject of the Queen of Great Britain and Ireland, residing at Urmston, in the county of Lancaster, England, have invented a new and useful Improvement in Fishing-Reels, (for which I have obtained a patent in Great Britain, No. 2,900, bearing date February 29, 1888, and a second patent, No. 8,122, dated June 4, 1888,) of which the following is a specification.

The object of this invention is, first, an improved construction of the outer frame-work or casing of the reel, whereby the same is rendered more rigid and steadier in action and also more commodious internally to receive the fishing-line; second, an improved means of securing the reel in position upon the central boss or axis and of ventilating the interior of the reel, so as to facilitate the quick drying of that part of the line which is wound nearest the axis, and, third, an improved means of adjusting the drag on the reel to the greatest nicety.

On the accompanying drawings, Figure 1 is a front exterior view, and Fig. 2 a transverse or side sectional view, of a fishing-reel embracing my improvements. Figs. 3 and 4 are side sectional views, respectively, of the outer frame-work and of the reel, both shown separately. Fig. 5 is a detail view of the spring. Fig. 6 is a section through the reel-axis, showing the means for adjusting the resistance. Figs. 7 and 8 are detail views of the spring and its connections for adjusting the resistance.

In performing my invention I construct the outer part of the frame in one brass or other suitable metal casting (marked $a$) and with suitable orifices formed therein all round to lighten it and also to permit the fishing-line to pass through. The opposite side of the improved frame is open to allow the reel $d$ to pass in and out sidewise and to slide on the hollow boss or axis $e$.

To secure the reel $d$ (when in position in its frame) and with facility to revolve upon its axis, I form an annular groove $f$ around the hollow stationary boss or axis $e$, in which I insert a steel or other spring-wire ring $g$, which when distended, as seen in Fig. 3, is of slightly larger diameter than the axis $e$, but capable of being squeezed entirely into the said groove by reason of the ends of the ring $g$, which are normally separated a short distance, as seen in detached view, Fig. 5, being capable of approaching each other in putting on or removing the reel. It will now be apparent that by having a corresponding groove $h$ formed on the inside of the bore of the reel $d$ and immediately opposite to that in the boss $e$ when the two grooves $f$ and $h$ come opposite each other the spring $g$ will fly out and so secure the two parts together, that they can only be separated again by the exercise of sufficient force to overcome the spring-pressure; and in order to ventilate the interior of the reel as aforesaid, instead of winding the line down to the bottom of the reel, I arrange a series of transverse bars or rods $i$, separated sufficiently from each other and from the boss $e$ to allow an air-space $j'$ beneath, and by having side openings $k'$ in the reel, either alone or in combination with perforations $l'$ in the hollow axis, I thus permit the entrance of currents of air for ventilating and drying purposes.

To adjust the resistance of the reel to rotary motion, I use a pair of friction-disks $j$ and $k$, as illustrated by sectional view, Fig. 6, drawn together by a spiral spring $l$, passing through the hollow axis of the reel and so pressing one disk $k$ upon the outside of the casing $a$ and the other disk $j$ upon the reel $d$. These disks $j$ and $k$ (shown separately by end view and side view, Fig. 7) are provided on their inner faces with bosses which enter the hollow axis $e$ at opposite extremities, as illustrated. The disk $j$ is prevented turning upon its axis by having a pin $m$ projecting from its boss, which enters a slot formed to receive it in the said hollow axis. Projecting from the corresponding boss of the other disk $k$ is a screw $o$, which screws into a nut $p$, fixed to the other extremity of the spiral spring $l$. By having a milled edge formed upon this disk $k$ a convenient means is afforded of turning it upon its axis and thus of drawing out or extending the spiral spring $l$ to any desired extent. In this manner the tension between the two friction-plates is increased, and thus more or less frictional resistance can be interposed to the turning of the reel $d$ and the drag upon the reel can be adjusted to the greatest nicety.

I find that a convenient and effective means of securing the extremities of the spiral spring to the boss of the disk-plate $f$ at one end and to the nut $p$ at the other is to form a spiral groove (see Fig. 8) upon such boss and nut to correspond with the inside of the coils of the spiral spring $l$, and whereby I am enabled to screw one into the other to the extent of two or three coils and thus to effect a connection which only becomes tighter the more the spiral spring is extended.

It will be apparent that this my improved friction mechanism is applicable to other classes of fishing-reels having a hollow axis.

What I claim is—

1. In a fishing-reel, the combination, with the frame provided with an open side and a tubular axis projecting from its closed side, of the reel provided with a hub journaled upon the said axis, the flanges at each end of the hub, a series of bars for the line to be wound on supported between the said flanges, and air-holes communicating with the air-space between the said bars and the reel-hub for ventilating the coiled line, substantially as shown and described.

2. The combination, with the frame provided with a central axis and a groove around the said axis, of a reel provided with a hub having an internal groove arranged opposite to the said groove in the axis, and a spring-ring inserted in the said meeting grooves, substantially as and for the purpose set forth.

3. The combination, with the frame provided with a tubular axis, of a reel journaled on said axis, the friction-disks bearing against the frame and the reel, respectively, and a spring inside the said axis for coupling said disks, substantially as and for the purpose set forth.

4. The combination, with the frame provided with a tubular axis, of a reel journaled on said axis, the friction-disk $j$, secured to the end of the axis and bearing against the flange of the reel, the spring having one end engaging with spiral grooves formed in a projection on disk $j$, the nut $p$, having spiral grooves engaging with the other end of said spring, and the revoluble friction-disk $k$, bearing against the frame and provided with a screw for engaging with said nut and adjusting the tension of the spring, substantially as and for the purpose set forth.

In testimony whereof I affix my signature to the foregoing specification.

JOHN BROWN MOSCROP.

Witnesses:
JOHN G. WILSON,
WALTER GUNN.